United States Patent Office 3,213,003
Patented Oct. 19, 1965

3,213,003
ELECTROPHOTOSENSITIVE COPY SHEET AND METHOD OF USE THEREOF

Edgar G. Johnson, St. Paul, Minn., and Byron W. Neher, Hudson, Wis., assignors to Minnesota Mining and Manufacturing Company, St. Paul, Minn., a corporation of Delaware No Drawing. Filed Aug. 1, 1961, Ser. No. 128,396
14 Claims. (Cl. 204—18)

This application is a continuation-in-part of application Serial No. 575,070 filed March 30, 1956, now U.S. Patent 3,010,883 and application Serial No. 692,529 filed October 28, 1957, now U.S. Patent 3,010,884.

This invention relates to the formation of permanent visible reproductions of light-images on light-sensitive surfaces by methods involving electrolysis at the exposed light-sensitive surface. The process is direct and extremely rapid. It is useful in the reproduction of all types of light-images, but is particularly applicable to the printing of enlargements from microfilm. Electrolysis may be carried out either simultaneously with, or subsequent to, exposure of the light-sensitive surface to the desired light-image.

Photosensitive sheet materials having surface layers which become electrically conductive when irradiated with light of the proper wave-length are well known. Selenium is a typical surface layer material. Cuprous oxide has also been used. These materials are highly colored and hence do not lend themselves to the direct production of copies. However, since the conductivity of the surface varies with incident light, such sheets have been found useful in the transfer copying or reproduction of light-images. For example, powdered colored resins are electrostatically adhered to the exposed and differentially charged surface in a pattern corresponding to the light-pattern initially applied, and are then transferred to a paper or other surface and fused in place to provide a permanent reproduction. The differential conductivity pattern produced by illumination with the light-image, and which is responsible for the differential charge pattern in the above process, may alternatively be used in forming reproductions in absorbent paper containing suitable electrolytes. These various processes permit reuse of the photosensitive sheet material; but such reuse is limited because of the fragile or unstable nature of the surface involved, and is likely to result in the production of "ghost images." The process in general produces reverse reproductions of light images.

The present invention, on the other hand, involves the formation of a permanent visible image directly on the photosensitive surface of a stable and rugged, normally white or faintly tinted, sensitive sheet material. The image may be either positive or negative, i.e., either the same as, or the reverse of, the applied light-image in location of light and dark areas, and may be either direct or reverse. The image is formed rapidly and with fine detail and effective contrast, and requires no subsequent heating, developing, fixing or other analogous operations. Ghost image formation is completely avoided.

These and other advantages are obtained, in accordance with the principles of this invention, by activating with a light-image a receptor sheet having a strongly photoconductive water-resistant zinc oxide layer on an electrically conductive backing, and then electrolyzing an electrolytic developer solution at the light-exposed and electrically conductive surface areas to form a visible image on said sheet.

As an example of an important field of utility, this invention has made possible the direct copying of microfilm reproductions of printed pages of books or the like in the same dimensions as the original page and within a time of not more than about five or ten seconds from initial inspection of the light-image to delivery of the completed print. With microfilm in conventional roll form, prints of desired frames are produced at substantially no increase in the time required for merely scanning and selecting the frames. Apparatus for effecting such operations is described and claimed in copending application Serial No. 686,237, filed September 25, 1957, now U.S. Patent No. 3,011,963.

The intensity of illumination, time of exposure and development, and electrical potential which may safely and efficiently be employed in the operation of copying apparatus as just described are severely limited. For practical commercial operation it has been found desirable, for example, to employ conventional projection lamp sources of illumination, to restrict the time of exposure and development to not more than a few seconds, and to restrict the applied potential to not more than about 50–100 volts. The copy sheet should be flexible for easy handling, yet the photosensitive material must remain a permanent component thereof.

As a specific example, permanent enlarged copies of microfilm originals are now successfully rapidly produced on the copy sheet material of this invention supplied in roll form. A full letter-size light-image is projected to the copy sheet from a 35-mm. microfilm transparency of average optical density by means of a 300-watt incandescent-filament projection lamp. After exposure for not longer than about five seconds, the exposed sheet is developed within a total further time not exceeding about five seconds, at a potential in the neighborhood of 20 volts D.C., to provide clear and distinct image areas of high contrast and excellent detail, requiring no fixing, washing or other additional processing. Under such conditions, sheet materials prepared in accordance with prior art teachings for use in the electrostatic methods of copying have been found to be completely inoperative.

The following example illustrates a specific formulation and procedure for the preparation of strongly photoconductive copy sheets useful in the copying of light-images by the novel electrolytic methods herein described.

EXAMPLE 1

A suitable light-sensitive sheet material was first prepared. A flexible film of transparent cellulose acetate having a thickness of about 10 mils (0.010 inch) was first metallized on one surface, by vapor deposition in a vacuum, with an extremely thin coating of aluminum. The coating was found to have a surface resistivity of about 200 ohms per square, and transmitted about 55% of incident light in the visible range. Over this metal layer was then applied a suspension of 48 parts by weight of zinc oxide microcrystals in a solution, in 48 parts toluene, of 4 parts of "Pliolite" resin, a resinous copolymer of butadiene and styrene, serving as a binder, the mixture having been ground in a ball mill until smooth. After drying, the firmly bonded smooth white coating was found to be between about 0.3 and about 0.6 mil in thickness. The sheet material was highly water-resistant.

Sheet material prepared as just described was suspended in a transparent glass cell containing a solution of 28 grams of copper sulfate in 200 ml. of water. A flat electrode of slightly larger area, in this case a copper plate, was suspended in the solution facing and somewhat removed from the coated surface of the sheet material. A light-image was focused on the uncoated surface of the sheet through the glass wall of the cell, the source of the light being a 100-watt bulb and providing an intensity of about 70 foot-lamberts. Exposure was maintained for about 5 seconds. A source of potential was then connected across the copper plate and the conductive aluminum layer of the sensitive sheet, the latter being connected to the negative pole, and a current of about 15 milliamperes was passed through the system for about 3 seconds. The sheet was withdrawn and rinsed, and was found to have a negative reproduction of the light-image on the sensitive coating. Non-illuminated areas of the sensitive coating remained white, while the exposed areas were darkened by deposition of metallic copper thereon.

Equally effective copy was obtained by exposing the coated sheet to the light-image under dry conditions, and then promptly immersing the sheet in the electrolytic cell and electrolytically developing the image in the manner described.

Silver nitrate solution was substituted for the copper sulfate to provide equally effective image development. Nickelous chloride is also effective, and is improved by the addition of sodium thiosulfate. A particularly effective developing solution contains 10% nickelous chloride and 5% sodium thiosulfate.

The ratio of zinc oxide pigment to binder in the light-sensitive coating was effectively varied over wide ranges. At 12 parts of zinc oxide to one of resin, as in the specific formula just given, the white areas of the print are sometimes found to contain dark spots, indicating non-uniform or insufficient resistivity. Excellent prints are obtained at lower ratios, for example at 8:1 and at 4:1. Somewhat less effective prints are obtained at 3:1 ratios of zinc oxide and "Pliolite" resin, and at 2:1 the light-sensitivity is inadequate and the results are decidedly inferior. These ratios may be specifically different with other specific oxides and resins but will serve to illustrate a generally desirable range.

Electrically conductive glass plates have been substituted for the partially transparent metallized cellulose acetate film as a carrier or base for the light-sensitive coating. A glass having a surface layer high in stannic oxide, having a surface resistivity of about 600 ohms per square and a light transmission of at least about 90%, has proven useful, although somewhat lower resistivity is preferred.

The sensitive surface of such transparent photosensitive coated plates is effectively exposed to the light-image through the transparent plate and simultaneously electrolytically developed, as described in the foregoing example. These plates may alternatively be first exposed to the light-image and then, without further irradiation, transferred to the developing station and separately developed, the "light-memory" of the zinc oxide coating being sufficient to maintain the necessary conductivity at the irradiated areas. The latter procedure is equally effective on fully opaque plates such as metal plates coated with the sensitive zinc oxide coating.

Opaque plates have been simultaneously exposed and developed by substituting a copper wire frame for the copper plate of Example 1 and then exposing the sensitive surface of a coated metal plate to a light-image through the frame while carrying out the electrolysis as before. Where the plate area is too large for uniform electrolysis in this manner, a screen is provided in place of the frame, and the screen is moved steadily during electrolysis so as to avoid producing a visible shadow pattern on the sensitive sheet.

Direct current potential is prefrered, with the light-exposed sensitive sheet material normally being connected to the negative pole of the source, i.e. forming the cathode of the electrolytic developer cell. Due to the nature of the sensitive zinc oxide coating, however, it is found to be feasible to apply alternating current potential and still obtain usefully exact and dense reproductions. The coating appears to have a rectifying effect on such current.

EXAMPLE 2

In this example the sensitized surface is first exposed to a light-image and a visible reproduction is then developed by applying a thin layer of a suitable electrolytic developing agent directly against the exposed surface and applying an appropriate voltage across the interface.

In one modification the electrolyte, e.g. a copper sulfate solution as in Example 1, is applied to the exposed sheet by brushing with an ordinary paint brush which is connected to the source of potential. A visible image is produced within the short time required to draw the electrolyte-moistened brush slowly over the surface of the sheet.

A thin uniform layer of copper sulfate solution applied to a copper bar or drum which is then drawn or rolled across the exposed surface likewise permits adequate electrolysis to produce a visible image. Replacing the copper sulfate with tartaric acid produces the same result, the copper surface of the bar being dissolved and plated out on the sensitized surface.

Another modification employs a developer-sheet consisting of a conductive sheet of aluminum or copper foil coated with a moist layer of one part of gelatin and three parts of glycerine and containing a small amount of copper sulfate or silver nitrate. It is rolled out into intimate contact with the entire surface of the exposed light-sensitive sheet, and a potential then impressed across the foil and the conductive sheet. Electrolysis takes place at the light-exposed areas, resulting in formation of a visible image on the light-sensitive sheet.

The moist gelatin may also be replaced by a sponge, porous paper, or other absorptive material capable of retaining the electrolyte in quantity sufficient to provide the required developing action. Contact between sensitized surface and developing surface may be over the entire area simultaneously, or over a progressively advancing smaller area as obtained with a gelatin-coated roll.

EXAMPLE 3

The present example employs a normally solid developer material rather than the normally liquid or gelatinous electrolytic developer of the foregoing examples.

Polyethylene glycol melting at about 100° C. ("Carbowax 6000") is combined with small amounts of ethylene glycol and nicket chloride and coated in molten form in a thin layer over the oxide-coated surface of the sensitive sheet of Example 1, hardening to a waxy transparent solid. The sheet is exposed to a light-image and is then developed by slowly drawing a heated metal rod over the coated surface, the rod and sheet being connected to opposite poles of a source of potential. The coating melts and permits electrolysis to proceed, thereby forming a negative reproduction of the light-image. The image is fully visible through the cooled and hardened thin waxy surface layer.

Similar results are obtained with coatings of suitably electrolyzable materials in other heat-liquefiable normally solid solvent media such as polyacrylic acid, carboxymethylcellulose plasticized with glycerine, and gelatin plasticized with glycerine. Solvents which liquefy at moderate temperatures produce most effective development, since heating is found to reduce the "light-memory" of the zinc oxide coating; but effective prints have been obtained with binders melting as high as 100° C. or somewhat higher.

EXAMPLE 4

In the above examples, development has been achieved by the electroplating of a metal from a salt solution onto the exposed light-sensitive surface. Other reactions are also useful.

(A) The exposed surface is made the cathode in a system in which the electrolyte contains diazonium salts plus coupler materials in acid medium. Colored images are formed on the zinc oxide coating.

A specific electrolyte consists of a one-tenth molar aqueous solution of a mixture of equimolar proportions of tartaric acid, phloroglucinol, and the zinc chloride salt of p-diazo-N-ethyl-N-benzylaniline. The solution is applied, by brushing, to the coated surface of a sensitive sheet made as described in Example 1 which has previously been exposed to a light-image. The sheet is connected to the negative, and the brush to the positive side of a suitable source of potential during application of the solution. A blue-black coloration is produced at the light-struck areas. There is obtained a negative reproduction of the original light-image.

(B) The zinc oxide surface is first coated with a thin layer of a mixture of diazotizable amines and coupler materials, and an electrolyte is used which contains sodium nitrite. The sensitized sheet forms the anode. A specific coating consists of a one-tenth molar aqueous solution of a mixture of equimolar proportions of o-dianisidine and beta-naphthol. Electrolysis of the sodium nitrite at the exposed coated surface produces a dark blue color at the light-struck areas. The sheet has a light blue background color.

(C) Colloidal charged particles may be deposited from liquid suspension under the influence of the electric potential to form a visible reproduction of a light-image. Thus, a 1% suspension of Prussian blue in water produces a blue deposit on light-struck areas of the zinc oxide coated sheet when the latter serves as the anode. Simultaneous exposure and development results in rapid printing of high contrast reproductions, and is preferred where the light-image is not required to penetrate any substantial depth of suspension. Intense exposure in the absence of the colloidal suspension makes possible subsequent development of faint but visible images in the presence of the suspension.

(D) Zinc oxide coatings which are initially strongly colored, e.g., by the presence of suitable oxidizable or reducible dyes, are visibly altered at light-exposed areas by electrolysis in aqueous bleaching solution. This is an example of the formation of a positive image in which light-struck areas become light and unexposed areas remain dark. One such system employs a surface coating of methylene blue on the zinc oxide coating, the dye being rendered colorless at the light-struck areas of the sheet by electrolysis in water containing a small amount of citric acid or equivalent electrolyte.

The colored sensitive sheet is prepared by dipping the oxide-coated sheet of Example 1 into an aqueous solution of methylene blue dye. The dye is adsorbed on the surface of the zinc oxide particles. The dried sheet is normally blue in color, converting to white on electrolysis. While the dye has a tendency to fade on long aging or on exposure to sunlight, under normal conditions the image produced remains legible for at least six months or longer.

It has also been observed that a positive print made as just described, i.e., by reductive to a colorless condition of light-struck areas of a methylene blue surface coating on a photoconductive zinc oxide paper, may be converted to a negative print by deliberate re-oxidation of the leuco dye, for example, by exposure to gaseous oxygen. The re-oxidized dye areas are found to be of a distinctly darker blue than the original coated sheet. Presumably the distribution or particle size of the adsorbed dye is altered during the chemical conversion. The final copy is found to be completely stable except for the tendency to fade slowly on exposure to sunlight.

(E) Positive images are also formed with sheets carrying dyes which are more difficultly reducible than is methylene blue. "Celliton Blue BGF Extra," a diazonium dye, is one example. In such cases, zinc chloride, preferably together with sodium bisulfite, is added to provide a suitable mechanism for controlled reduction of the dye and the development of a visible image. The mechanism appears to involve the intial liberation of zinc metal, which, particularly in the presence of the sodium bisulfite, reduces the dye to the colorless state. Thus, analogous results are obtained by first developing a visible image on a light-exposed photoconductive zinc oxide copy sheet by electrolysis in a zinc chloride electrolyte in accordance with the method described under Example 1, and then treating the surface with a solution of the diazonium dye which is reduced and decolorized at the zinc-plated areas but retained in colored form at unplated areas of the zinc oxide coating. The solution preferably contains bisulfite in addition to the dye.

Images formed as just described will be seen to be positive images. They are much more stable against fading than are the sheets carrying triphenylmethane dyes, since the diazonium dye does not re-oxidize under atmospheric conditions once it has been reduced to the colorless form.

In all cases, the dye material must be reducible, under the conditions provided, to a visibly different state. It should also be substantive toward the zinc oxide coating so that it remains strongly affixed thereto.

A further variation involves the combination of visibly reducible dye and conductive zinc salt with the transparent fusible solid surface developer coating of Example 3. A solution of methylene blue in a mixture of zinc oxide, "Pliolite" resin binder and toluene-acetone solvent mixture was coated on conductive metallized paper, dried, and overcoated or surface sized with a thin layer of gelatin and zinc chloride applied from aqueous solution. The sheet was exposed to a light image and developed by brief contact with a heated metal rod, the rod and backing being connected to the positive and negative sides respectively of a controlled source of electricity. The blue dye was reduced to the colorless leuco form at the light-struck areas. Some of the fused surface layer was removed by the heated rod; the remainder hardened on cooling and protected the surface of the sheet. On continued exposure to the air, the leuco dye was re-oxidized, the thus affected areas then having a visibly darker blue shade than the surrounding areas of the sheet.

EXAMPLE 5

In this example water alone is applied to the sensitized and exposed sheet for electrolytic development of the visible image. The water may be applied in bulk, or preferably in physically bound form, and the required potential applied across the interface. Development is accomplished by release of soluble components from the sensitive surface itself. Thus, nickel acetate has been incorporated in the zinc oxide suspension, e.g., by grinding with the oxide in the binder solution, or alternatively has been applied as a thin surface layer over the dried zinc coating. For example, finely powdered nickel acetate is dusted over the still sticky surface of the zinc oxide coating just before drying is completed; or nickel acetate in aqueous solution, preferably together with small proportions of hydrophilic or water-soluble binder such as methyl cellulose or gelatin, is coated as a very thin film over the oxide coating and dried in place. The sheet is exposed to the light-image and is then contacted with a moistened current-carrying roll which is drawn slowly across the treated surface while an electric current is passed between sheet and roll. A visible reproduction of the light-image is produced on the treated surface. The sensitivity of the process is indicated by the observation that useful images have been developed by this procedure as well as by those described in connection with Examples 1 and 2, using as the electrolyte a mixture of only 10% water in alcohol.

EXAMPLE 6

A coating composition is prepared by first mixing together 640 grams of photoconductive zinc oxide pigment, 533 grams of a 30% solution of a 30:70 copolymer of butadiene and styrene in toluene ("Pliolite S–7" solution), and 353 grams of acetone. The mixture is then milled for about 8 hours in a one-gallon ball mill loaded to about half its volume with ½ inch diameter porcelain balls. The resulting slurry or suspension is thick and viscous but flows readily and can be spread with a coating knife to form a smooth uniform coating.

The suspension is coated on the clean metal surface of a laminate of thin paper and thin aluminum foil, and the solvent removed by evaporation, to provide a smooth uniform dried coating about 0.8 mil thick. The resulting sheet is flexible and the coating remains firmly bonded to the metal during handling or rolling of the sheet.

Reproduction of impressed light-images may be produced on the surface of the copy sheet of this example, prepared as just described, by either of the electrostatic or electrolytic methods previously identified. In the electrolytic method, a typical procedure is as follows:

The sheet, previously held under dark conditions for at least about one-half hour, is exposed to a light-image for about five seconds as previously noted. The negative pole of a 20 volt D.C. source of potential is then connected to the metal foil of the sheet, as by means of edge clamps, the positive pole being connected to a narrow strip of fine-grained cellulosic sponge partly saturated with an electrolytic developer solution of 3 parts by weight of cadmium nitrate tetrahydrate, 0.5 part each of tartar emetic and silver nitrate, and 100 parts of water. The sheet is drawn past the sponge at a constant rate such that each point of the surface remains in contact with the sponge for about 0.4 second. A dark deposit is formed at the light-struck areas, while the unlighted areas remain white. The sheet remains substantially dry. The dark image areas are effectively permanent.

The suspension of Example 6 was similarly coated on cellophane, which, because of a substantial content of humectant plasticizer, is found to be electrically conductive. The sheet produced excellent prints when charged, exposed, and developed by the elecrtostatic method. Under electrolytic development conditions, no visible copy could be obtained on such sheet material.

The cellophane was moistened with water and the thin active coating removed as a continuous film. The film was contacted on the initially exposed face surface with the electrolytic developer solution and on the initially concealed back surface with another aqueous electrolyte solution to provide a contact medium, and an appropriate potential was impressed across the two solutions while a light-image was directed at the film surface. No visible deposit could be obtained under these conditions, whereas the coated foil and paper laminate of Example 7, tested under the same conditions, was fully effective.

The face surface of the free film was firmly pressed against a clean metal foil and again tested. Substantially no visible deposit was obtained by electrolytic development. On the contrary, fully effective images were obtained with this structure when charged, exposed and developed in accordance with the electrostatic method.

The film was next metallized, by aluminum vapor deposition in vacuum, and again tested. When the metal was applied to the face surface of the film, no image could be produced on the back surface by electrolytic methods. However, a useful image could be produced by electrolytic development at the face side of the film which had been metallized on the back surface. It was observed that the back surface of the film removed from the cellophane was smooth, whereas the face surface was relatively rough and uneven when viewed under a microscope.

The paper-foil laminate used as the substrate or carrier in Example 6 was coated on the clean metal surface with the commercially available "Electro-fax" coating composition previously described. The brittleness of the coating resulted in flaking and loss of active material when the sheet was flexed or shaken. Effective copies could be produced on the carefully handled sheet by the electrostatic method, but no visible image was obtained by eleclytic development techniques as hereinabove described.

As above noted, the copy sheet of Example 6 was fully effective under commercially acceptable electrolytic developing procedures. It was observed, however, that light rubbing of the sensitive surface with a cloth moistened with a solvent for the polymeric binder rendered the surface completely inoperative toward such procedures. Similarly, coating the surface with a further very thin layer of a solution of the polymeric binder destroyed the effectiveness of the copy sheet for electrolytic image-development. In both instances the sheet produced acceptable copies when processed in accordance with the electrostatic method.

Contamination of the aluminum surface is also found to destroy the effectiveness of the completed copy sheet for electrolytic methods while still permitting successful electrostatic development. For example, a thin coating of polymer applied as a wash coat to the clean aluminum prior to application of the polymer-pigment mixture has completely prevented electrolytic development on the resulting sheet. Oily or greasy surface deposits on the foil are also detrimental. Surprisingly, attempts to clean the surface with alkali silicate solutions result in sheets which are even less susceptible to electrolytic development. It has been found, however, that brief contact of a soiled aluminum foil surface with strong aqueous alkali, e.g., 50% potassium hydroxide solution, followed by thorough rinsing and drying, provides a fully effective surface. The same result may be obtained by vapor deposition of aluminum on the base surface under vacuum, preferably after preheating in the vacuum. Vapor deposition of aluminum on other substrates, e.g. on cellulose acetate film has likewise produced an effective base material which when coated with the zinc oxide-polymer mixture of Example 6 has been found useful in electrolytic electrocopying procedures as hereinabove described.

The styrene-butadiene polymer employed ("Pliolite S–7") is soluble in toluol but insoluble in acetone. The addition of a further 650–700 grams of acetone to the approximately 1500 gram quantity of slurry as prepared in Example 6 results in the coagulation and precipitation of the binder and pigment. The much smaller amount of acetone present in the suspension as coated is insufficient to cause precipitation of any portion of the nonvolatile components, but nonetheless appears to have a desirable effect on the mixture both in respect to increasing the rate of drying of the coating and also in providing significant improvement in the ability of the copy sheet to undergo electrolytic image-development.

The utility of a photoconductive copy sheet for electrolytic image-development may be forecast to a considerable degree by measuring the photoconductive value of the sheet. A small section of the sheet material is insulated at back and edge areas with a nonconductive waterproof covering, e.g., of plastic adhesive tape, an electrical connection to the conductive metallic substrate being provided. The sample is suspended in a transparent glass cell containing 200 ml. of a solution of tenth-molar ammonium sulfate and facing an open frame electrode serving as the anode. Current flow per unit area through the measured thickness of the coating under an applied voltage is measured both with the sample under equilibrium dark conditions and when illuminated. A potential of 10 volts is convenient but not critical. Values at several thicknesses of coatings may be determined and the value at a standard thickness obtained by interpolation. A coating thickness of 0.8 mil as thus determined is convenient. Illumination is provided from a 500 watt incandescent-filament lamp, i.e. at an intensity of about 1300 foot-candles. The photoconductivity value may be calculated from the values thus obtained and is conveniently reported as mho/cm. Development has been carried out electrolytically with copy sheets having a photoconductivity value, as thus determined, as low as about $10^{-7}$ mho/cm. and as high as $10^{-4}$ mho/cm. or higher. However for effective commercial operations as hereinbefore described, copy sheets having photoconductivity values not less than about $10^{-6}$ mho/cm. are much superior and are preferred, and still higher values have also been attained. In all cases, the conductivity values under dark conditions must not be higher than about one-tenth of the photoconductivity value for best results in terms of electrolytic image-development, and usually the value is between one-tenth to one-hundredth and as high as one-thousandth.

Variations in the ratio of photoconductive powder and resinous binder material are found to produce significant variations in the effectiveness of the copy sheet in electrolytic image-development and analogously in the photoconductivity value as above defined. The following tabulation illustrates the results, in terms of photoconductivity values, obtained with a series of copy sheets prepared generally in accordance with the teachings of Example 6 but employing different pigment-binder ratios. In all cases the amount of volatile solvent was controlled to provide a viscous spreadable suspension, and the suspension was ball-milled until smooth and free of lumps on coating. The suspension was coated on the clean metal surface of the metal-foil laminate as employed in Example 6. Typical values of the apparent density of the coating and of the reflectance value are included.

*Properties of oxide-binder coatings*

| Weight ration, ZnO/binder | ZnO, Wt. percent | Photoconductivity, mho/cm. $\times 10^{-6}$ | Density, gm./cc. | Reflectance percent |
|---|---|---|---|---|
| 3.0 | 75.0 | 0.62 | 2.60 | 68.5 |
| 3.55 | 78.2 | 1.62 | ---------- | 69.5 |
| 4.0 | 80 0 | 1.81 | 2.78 | 72.5 |
| 4.1 | 80.5 | 2.22 | ---------- | 72.5 |
| 4.2 | 81.0 | 2.18 | ---------- | 71.5 |
| 4.3 | 81.3 | 2.03 | ---------- | 71.8 |
| 4.4 | 81.6 | 1.68 | ---------- | 80.5 |
| 5.0 | 83.6 | 0.38 | ---------- | 86.0 |
| 6.0 | 85.8 | ---------- | 2.43 | ---------- |
| 8.0 | 88.9 | ---------- | 2.17 | ---------- |
| 12.0 | 92.7 | ---------- | ---------- | ---------- |

EXAMPLE 7

A clean-surfaced aluminum foil and paper laminate as used in Example 6 was coated with a thin layer of a smooth suspension of 80 grams of high conductivity zinc oxide in a solution, in 80 grams toluene, of 40 grams of silicone solution (a 50% solution in xylol of alkyl aryl silicone resin capable of curing in one hour at 480° F. to a hard and somewhat brittle polymer). The suspension was milled in a one-pint ball mill with one-half inch porcelain balls for about 4 hours until smooth, and was coated at a thickness of 4–5 mils. After air drying the coating was about .8 mil thick. During the first several days the coating remained flexible and the sheet was highly effective as a copy sheet for electrolytic image-development. Subsequently the coating became somewhat brittle for effective retention on a flexible copy sheet.

The copolymer of styrene and butadiene employed in Example 6 as a binder for the light-sensitive zinc oxide is a water-resistant, flexible, adherent, film-forming polymer of highly satisfactory properties. It is light in color, and does not interfere with the light-sensitivity of the pigment. It is readily soluble in low cost solvents, yet the solvent may be removed without difficulty by forced drying. The polymer is relatively inexpensive and readily available. More particularly, the polymer does not appear to wet the zinc oxide powder, at least to the extent necessary to form a continuous film over the particles. Other binders meeting most or all of these requirements included polystyrene, chlorinated rubber, rubber hydrochloride, polyvinylidene chloride, nitrocellulose, polyvinyl butyral. On the other hand polymers which are dissolved or softened by water, or which are dark in color, or insoluble in commerical solvents, or reactive with the pigment, or which readily wet the pigment particles, are found to be ineffective. As typical examples, polyvinyl alcohol, polyacrylic acid, shellac, and sodium corboxymethyl cellulose are not acceptable as binders for the light-sensitive sheet materials of this invention.

The particular zinc oxide powder specified in Examples 6 and 7 is a pigment grade oxide of high purity and relatively large particle size, and is a preferred highly photoconductive powder for the purposes of this invention. As an indication of the photoconductivity, tests have been made of the powder in compressed slab form in the absence of polymeric binder. In making the test, a weighed 200 milligrams of the powder is uniformly distributed within an open channel 3 cm. long and 0.63 cm. wide formed between two parallel aluminum strips mounted on a flat Lucite plate. The powder was compressed with a close-fitting flat ram under a pressure of 214 lbs./sq. in., forming a compacted slab about 0.05 cm. thick connecting the aluminum strips. The block was maintained under anhydrous conditions over calcium sulfate and at normal room temperature. Current flow through the compacted slab between the aluminum strips was determined at an impressed potential of 100 volts D.C. although results were substantially the same when the test was run at 10 volts. The sample was first placed under equilibrium dark conditions. It was then exposed to light from a 500 watt tungsten filament projection bulb operated at a color temperature of 3100° K., the light passing through a glass-walled water-filled filter cell and providing an illumination of approximately 0.019 watts/sq. cm. of radiant energy, about 0.005 watts being in the visible region between about 0.38 and about 0.70 micron wavelength. Finally, the sample was again returned to dark conditions and testing was continued until the rate of current flow had diminished to one-half the maximum obtained during illumination of the sample. From the measured current flow and dimensions of the test sample, the apparent conductivity was calculated to be as follows:

*Apparent conductivity of compressed zinc oxide*

| | | |
|---|---|---|
| Equilibrium dark conditions | mho/cm | $3.2\times10^{-11}$ |
| Illuminated 5 seconds | mho/cm | $5.0\times10^{-8}$ |
| Half life | second | 1 |

The term "apparent conductivity" is used since the effect of the illumination is necessarily confined to the surface layers and does not extend uniformly throughout the thickness of the sample.

Other zinc oxides and other photoconductive powders having equivalent apparent photoconductivity values in compressed slab form are also found to provide adequate photoconductivity values in coated film form and to produce copy sheets susceptible of electrostatic image-development when suitable precautions are taken in selection and treatment of other components in accordance with disclosure herein provided. As one example, 2.35 parts by weight of a sample of high photoconductivity cadmium sulfide powder, having a compressed slab photoconductivity value in the test described above of $4\times10^{-9}$ mho/cm. and a dark conductivity of $4\times10^{-13}$ mho/cm., was combined with one part of the polymeric binder of Example 6 and coated on clean metal foil to provide a useful copy sheet having a dark conductivity value of $4.4\times10^{-8}$ mho/cm. and a photoconductivity value of $6\times10^{-7}$ mho/cm. The sheet provided useful copy by electrolytic image-development, but required somewhat higher light-image intensity, or time of exposure, or impressed voltage than is desirable for many commercial operations, and in addition required that exposure and development be accomplished simultaneously.

In the foregoing formulations the amounts of photoconductive powder and polymeric binder have been expressed for convenience in terms of weight proportions. A more accurate method of expressing these relationships is in terms of volume. It is found that coatings in which the volume of the photoconductive particles come within the range of about 30–55% of the total volume of particles and binder provide the best results in terms of maximum photoconductivity values and, more importantly, in terms of high quality performance in electrolytic image-development. With significantly lesser amounts of the powder component in the sensitive coating, effective image-development by electrolytic means cannot be attained regardless of the compressed-slab photoconductivity value of the powder. With significantly greater amounts of the powder component, the electrolytic image-developing procedure is found to cause the formation of numerous dark spots on areas over the sensitive surface. Significantly, these wider ranges of proportions offer no difficulties in the electrostatic image-developing procedures.

In the foregoing examples the strongly photoconductive coatings have been applied to clean aluminum surfaces; and such substrates are preferred both for reasons of availability and economy as well as providing desirable reflectivity and other properties. Other metallic substrates, such as silver and copper, may be substituted where suitable precautions are taken to provide a clean conductive surface. For many purposes the substate need not be flexible. Thus, thick metal plates may be coated with the sensitive composition and images formed thereon by electrolytic development procedures as an aid in subsequent machining of the plate, in making meter dials or other printed metal articles, or for other purposes. In all cases it is necessary that a clean, electronically conductive carrier or substrate surface be provided, as distinguished, for example, from an ionically conductive material; and that the binder component permit the attainment of conductive contact between particle and substrate as well as between adjacent particles, while still holding the particulate layer to the conductive supporting surface; and further that the outer surface layer of particle be exposed for eventual direct contact with the electrolytic developer solution. The application of these requirements, taken together with the required high degree of photoconductivity and relatively low dark conductivity of the photoconductive powder material as hereinbefore defined, has now been shown to provide for a copy sheet material capable of rapidly yielding effective copies of light-images by novel electrolytic image-developing procedures not applicable to previously available photoconductive copy sheet materials and having particular applicability to the rapid commercial preparation of enlarged permanent copies of microfilm originals.

We claim:

1. A light-sensitive sheet capable of making a reproduction of a light-image thereon which comprises an electrically conductive carrier and a photoconductive material having a conductivity of at least $10^{-7}$ mho per cm. on exposure to light bonded to said conductive carrier and to an overlying normally solid, water-soluble top layer containing a developer material different from said photoconductive material which is capable of effecting a visible color change on said photoconductive material when subjected to electrolysis.

2. A light-sensitive sheet material suitable for making visible reproductions of light-images, comprising in sequential order an electrically conductive carrier web, an inner photoconductive zinc oxide layer bonded to said conductive carrier web, and an outer layer bonded to said zinc oxide layer comprising a normally solid, water-soluble binder and developer material which is capable of effecting a visible color change on said zinc oxide layer when subjected to electrolysis.

3. A light-sensitive sheet material suitable for making positive visible reproductions on said sheet material of light-images impressed thereon, by electrolytic development, said sheet comprising in sequential order a laterally electrically conductive carrier web and bonded thereto a photoconductive zinc oxide coating including a colored, transparent, electrolytically reducible normally solid, water-soluble dye firmly affixed over at least those surfaces of the zinc oxide particles which in the absence of said dye would normally be directly visible.

4. A light-sensitive sheet material suitable for making thereon visible reproductions of light-images, comprising an electrically conductive carrier web and a photoconductive zinc oxide layer bonded to said conductive carrier web, including a normally solid, water-soluble developer material, the aqueous solution of which is an electrolyte, firmly affixed over said zinc oxide layer.

5. The light-sensitive sheet material of claim 4 in which the water-soluble material inclules a salt of a heavy material.

6. The method for making a positive reproduction which comprises exposing to a light-image a colored copy sheet containing a photoconductive layer in combination with colored reducible normally solid, water-soluble dye layer overlying said photoconductive layer and electrolytically developing said copy sheet by contacting the exposed surface of said copy sheet with an electrolytic solution and creating an electrical potential between said copy sheet and said electrolytic solution to reduce said dye.

7. The process of claim 6 in which said reducible dye is a triphenylmethane dye.

8. The process of claim 6 in which said reducible dye is methylene blue.

9. The process of claim 6 in which said reducible dye is a diazonium dye.

10. The process of claim 6 in which said reducible dye is Celliton Blue BSF Extra.

11. The process of claim 6 in which said electrolytic solution comprises citric acid.

12. The process of claim 6 in which said electrolytic solution comprises zinc chloride.

13. The process of claim 6 in which said photoconductive layer comprises zinc oxide.

14. The process of claim 6 in which said photoconductive layer comprises cadmium sulfide.

References Cited by the Examiner

UNITED STATES PATENTS

| | | | |
|---|---|---|---|
| 2,692,178 | 10/54 | Grandadam | 96—1 |
| 3,010,883 | 11/61 | Johnson et al. | 204—18 |
| 3,010,884 | 11/61 | Johnson et al. | 204—18 |
| 3.011,963 | 12/61 | Johnson et al. | 204—18 |

FOREIGN PATENTS

| | | |
|---|---|---|
| 464,112 | 4/37 | Great Britain. |

JOHN H. MACK, *Primary Examiner.*

JOSEPH REBOLD, *Examiner.*